UNITED STATES PATENT OFFICE.

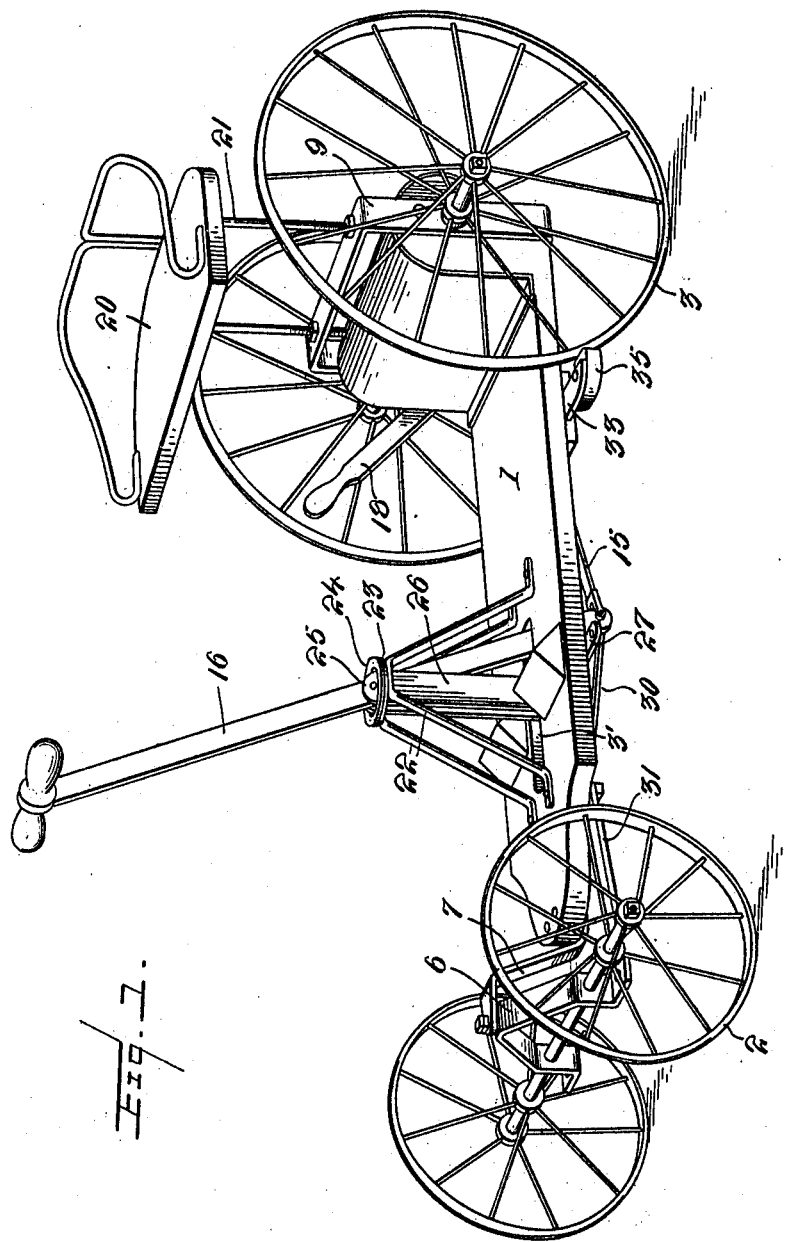

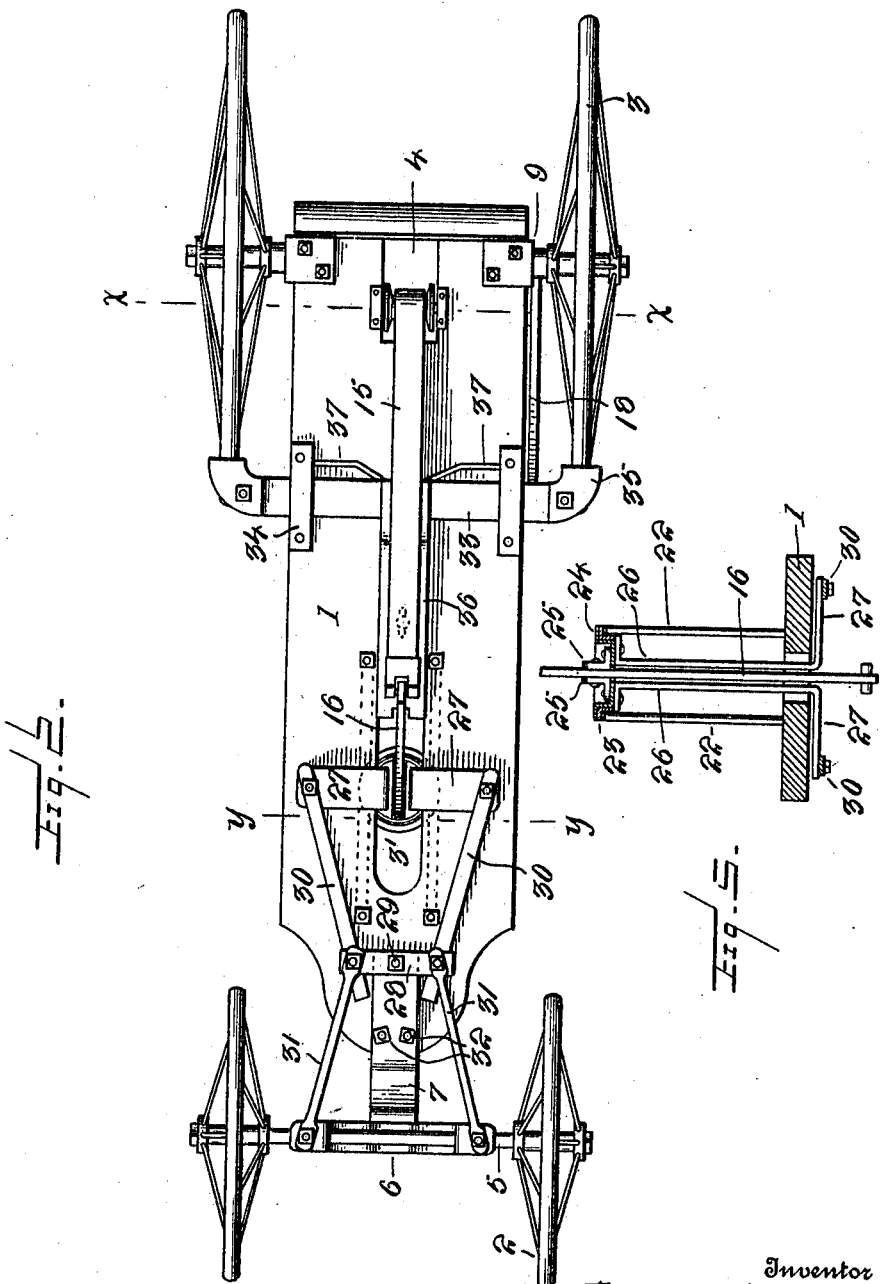

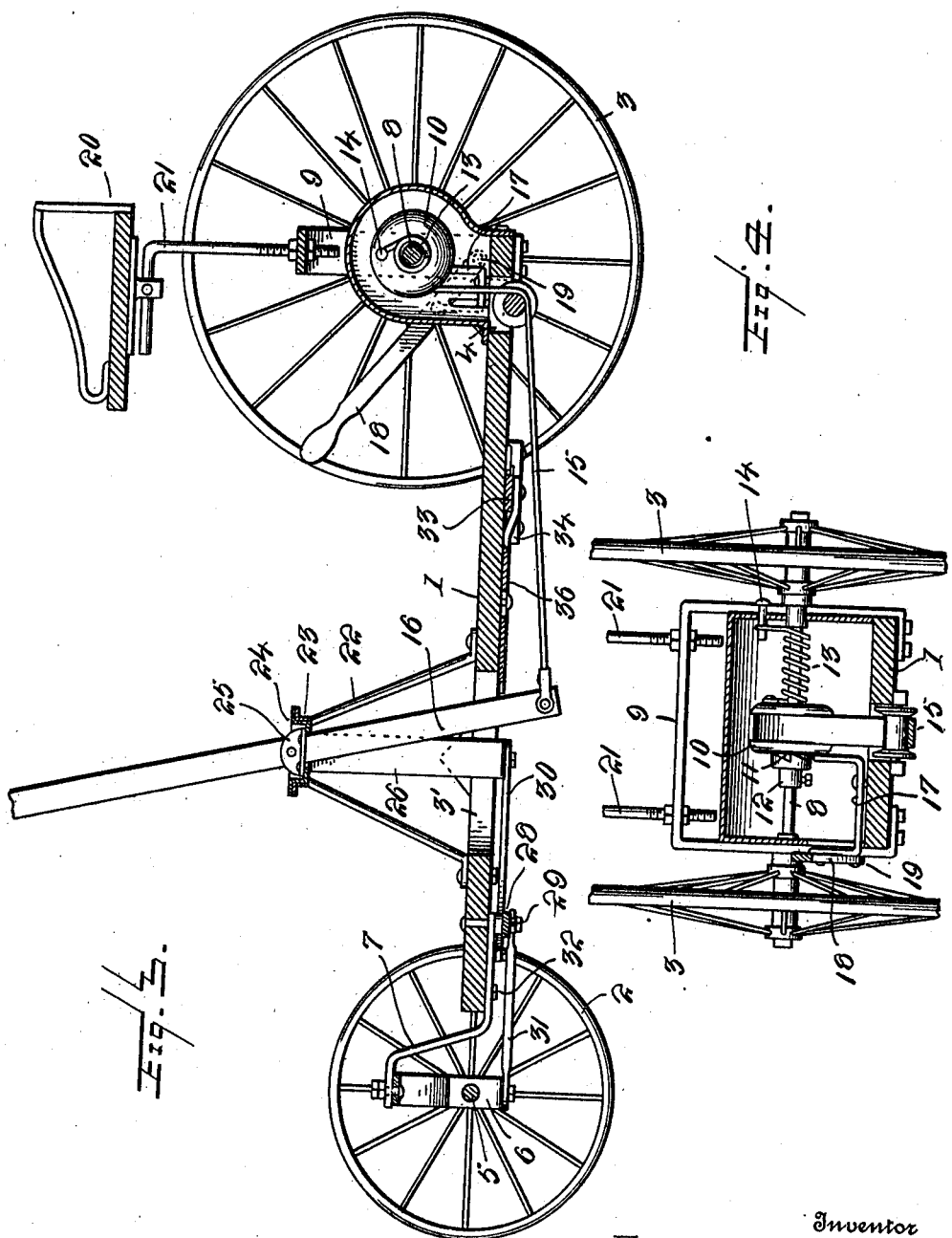

FRANK A. GAGNON, OF WATERTOWN, NEW YORK.

VELOCIPEDE.

980,092.  Specification of Letters Patent.  Patented Dec. 27, 1910.

Application filed May 21, 1910. Serial No. 562,682.

*To all whom it may concern:*

Be it known that I, FRANK A. GAGNON, a citizen of the United States, residing at Watertown, in the county of Jefferson and State of New York, have invented new and useful Improvements in Velocipedes, of which the following is a specification.

The present invention is primarily designed to provide a wagon for children which may be propelled by manual power, preferably applied through a hand lever, the purpose being to devise a combination of parts whereby the operating handle may be used as the propelling means, for setting the brakes, and for steering, thereby enabling any one of the three operations being effectively performed without necessitating the provision of different levers for each and with the result that the occupant of the vehicle may have the same under control at all times.

The invention also provides novel propelling means which admits of the vehicle coasting and the speed being controlled by the same means employed for steering and and for propelling the vehicle.

A further purpose of the invention is the provision of novel and peculiar steering mechanism whereby the vehicle may be properly directed in any position of the operating lever.

The invention consists of the novel features, details of construction and combination of parts, which hereinafter will be more particularly set forth, illustrated in the accompanying drawings, and pointed out in the appended claims.

Referring to the drawings, forming a part of the application, Figure 1 is a perspective view of a velocipede or child's wagon embodying the invention. Fig. 2 is a plan view of the wagon inverted. Fig. 3 is a vertical central longitudinal section of the vehicle. Fig. 4 is a transverse section on the line *x—x* of Fig. 2. Fig. 5 is a transverse section on the line *y—y* of Fig. 2.

Corresponding and like parts are referred to in the following description, and indicated in all the views of the drawings, by the same reference characters.

The body of the vehicle comprises a platform 1, which is mounted upon front wheels 2 and rear wheels 3. The platform 1 usually consists of a board and is provided with slots 3' and 4. The front wheels 2 are loosely mounted upon the ends of an axle 5, which is mounted in the lower ends of a frame 6 which is of substantially V-form and has pivotal connection at its upper end with an arm 7 bolted or otherwise secured to the platform 1. The rear wheels 3 are secured to an axle 8, which is mounted in the side members of a frame 9 of substantially U-form bolted or otherwise secured to the platform 1. The wheels 3 constitute drivers, hence are secured to the axle 8 to turn therewith. In order to facilitate the turning of the corners one of the wheels 3 may be loose upon the axle. The driving power is applied to the axle 8 and is intermittent in operation.

A drum 10 is loose upon the axle 8 and is provided with a half clutch 11 which is adapted to coöperate with a half clutch 12 secured to the axle 8. A coil spring 13 mounted upon the axle 8 has one end secured to the drum 10 and its opposite end made fast to a pin 14 projecting from a side member of the frame 9. When the drum 10 is turned forward the teeth of the clutch member 11 engage with the teeth of the clutch member 12 and cause the axle 8 to turn forward and thereby propel the vehicle. When the vehicle tends to move forward by running down grade or from any other cause the teeth of the half clutch 12 ride upon the teeth of the half clutch 11 without producing any movement of the drum 10. When the vehicle moves backward the teeth of the clutch member 12 engage with the teeth of the clutch member 11 and rotate the drum 10 backward and under this condition and to prevent injury to the spring 13 the brakes are automatically set, as will appear more fully hereinafter. A strap 15 is secured at one end to the drum 10 and is wound thereon, the opposite end of the strap being connected to the lower end of the operating lever 16. The lever 16 occupies an upright position and normally inclines forwardly at its upper end, which latter is provided with a handle bar. Upon drawing the upper end of the operating lever 16 backward the rear portion of the strap 15 wound upon the drum 10 is unwound therefrom, thereby causing the drum to rotate and to impart a corresponding movement to the clutch member 12 and the axle 8, whereby the vehicle is given a forward impetus. As the strap is unwound from the drum 10 the spring 13 is correspondingly wound or subjected to a greater tension. Upon releasing the operating lever the spring 13 operates to turn the drum 10 and rewind the parts of the strap thereon previously unwound therefrom. By alternately pulling upon and relaxing the upper end of the operating lever 16 the drum 10 is intermittently rotated, thereby imparting intermittent impulses to the vehicle whereby the same is propelled. When it is desired to coast the drum 10 is moved upon the axle 8 to cause the clutch member 11 to clear the clutch member 12, thereby admitting of the axle 8 rotating freely without causing injury to the propelling means. The drum 10 may be moved inward against the tension of the spring 13 by means of a shipper 17, which is mounted upon the platform adjacent the rear axle so as to tilt, said shipper having an arm extending alongside the outer end of the drum 10. A lever 18, pivoted at 19 to a side member of the frame 9, is pivoted to an arm of the shipper 17 and serves to tilt or operate said shipper so as to press the drum 10 inward. It is observed that the spring 13 serves both to press the drum 10 outward and to rotate the same backward to wind the rear end of the strip 15 thereon.

The seat 20 is adjustable vertically and in the length of the vehicle so that it may be readily adapted to suit the convenience and comfort of the occupant. Standards 21 have their lower ends threaded and passed through openings in the horizontal portion of the frame 9 and provided with upper and lower nuts, whereby the standards may be adjusted vertically and made secure in the adjusted position. The upper ends of the standards 21 are bent about at a right angle and are formed with openings to receive screws or like fastenings whereby the seat 20 may be secured thereto in the required position. The seat 20 is generally of wood and is provided with a back formed of stout wire bent into the required shape and secured to the seat. By having the seat 20 formed of wood it is evident that it may be readily adjusted forwardly or rearwardly upon the upper ends of the standards 21 and secured thereto in the desired position.

Standards 22 are secured to the platform 1 upon opposite sides of the slot 3' and are connected at their upper ends by means of a ring 23, which is preferably of L-form in cross section so as to provide both a horizontal and a vertical flange. A head piece 24 is mounted upon the ring 23 to turn horizontally and comprises an outer portion which overlaps the horizontal portion of the ring 23 and a depressed portion which fits within the vertical flange of said ring 23. The head piece is formed with a centrally disposed slot through which the operating lever 16 passes, the latter being pivoted to angle lugs 25 secured to the head piece 24 upon opposite sides of the slot thereof through which the operating lever 16 passes. Bars 26 have their upper ends secured to the head piece 24, the upper ends of said bars being outwardly bent and underlapping the vertical flange of the ring 23, thereby serving in conjunction with the outer portion of the head piece to prevent vertical displacement of said head piece. The bars 26 occupy a vertical position and are located upon opposite sides of the operating lever 16 and their lower ends pass through the slot 3' and are bent outwardly, as indicated at 27. The bars 26 are adapted to turn with the operating lever when the same is moved to effect steering of the vehicle, the slot 3' being of ample width to admit of the turning of the bars 26. By mounting the operating lever 16 in the manner stated it is obvious that the same may be oscillated to and fro and also turned about a vertical axis.

A lever 28 extends transversely of the platform and is pivotally connected at a central point thereto, as indicated at 29. Links 30 connect the ends of the lever 28 with the outer extensions 27 of the bars 26. Other links 31 connect the ends of the lever 28 with the lower bent ends of the frame 6, hence upon turning the operating lever 16 the head piece 24, bars 26, lever 28 and axle 5 are correspondingly turned, thereby causing the vehicle to travel in the desired direction. It is noted that the operating lever may be turned at any time and in any position at the ends of or intermediate of its oscillatory movement. The movement of the lever 28 is limited in each direction to prevent the front wheels 2 from coming in contact with the platform. The nuts 32 applied to the bolts securing the bracket 7 to the platform serve as stops for the ends of the link 30 to come in contact with, the bolts being so positioned to enable the nuts 32 to limit the movements of the link 30 in the manner stated.

A brake beam 33 is mounted beneath the platform in keepers 34 and is provided at its ends with brake shoes 35 arranged to be brought in contact with the rims of the wheels 3. An arm 36, connected to the brake beam 33, extends forwardly therefrom in position to be engaged by the lower end of the operating lever 16 when the upper end of the operating lever is pressed forwardly by the occupant or when the lower end of the operating lever is drawn rearwardly by the winding of the strap 15 upon the drum 10 due to backward movement of the vehicle when the clutch members 11 and 12 are in engagement, thereby setting the brake and preventing injury to the spring 13. When it is required to apply the brake the upper end of the lever 16 is pressed forward. Upon backing the vehicle when the clutch is set the strap 15 is wound upon the drum 10, thereby drawing the lower end of the lever 16 rearward and carrying the brake beam 33 therewith and bringing the brake shoes 35 in forcible contact with the wheels 3. Springs 37 release the brakes.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In a vehicle and in combination with the propelling mechanism and brake devices, an operating lever for actuating the propelling means and for setting the brake, connecting means between the operating lever and the propelling means, and means connected with the brake and adapted to be actuated by the said operating lever when it is required to set the brake.

2. In a vehicle provided with propelling means, brake devices and steering mechanism, an operating lever common to each of the mechanisms, connecting means between the operating lever and the propelling means, other connecting means between said operating lever and the steering mechanism, and means connected with the brake and adapted to be actuated by the said operating lever when it is required to set the brake.

3. In a vehicle comprising a brake mechanism and a steering mechanism, means for propelling the vehicle, an operating lever for controlling both the brake and the steering mechanisms, connecting means between said operating lever and the steering mechanism, and other means connected with the brake mechanism and adapted to be actuated by the operating lever when it is required to set the brake.

4. In a vehicle the combination of a drive wheel, a clutch member connected with the drive wheel, a drum loosely mounted and provided with a clutch member to coöperate with the clutch member connected with said drive wheel, a spring connected with said drum, means for imparting a positive intermittent movement to the drum for operating said drive wheel, and a shipper for moving the drum to throw the clutch out of action.

5. In a vehicle the combination of a drive wheel, a clutch member connected with said drive wheel, a loosely mounted drum having a clutch member to coöperate with the first mentioned clutch member, a helical spring serving to press the drum toward the first mentioned clutch member and to turn said drum backward when released after being turned forward, and means for imparting an intermittent rotary movement to said drum to operate the drive wheel.

6. In a vehicle the combination of drive wheels, a drum, connecting means between the drive wheels and drum including a clutch, a spring for turning the drum backward and to move the same to hold the clutch in engagement, operating means for imparting a positive intermittent movement to said drum, a brake mechanism arranged to coöperate with said drive wheels, and brake operating means arranged in the path of movement of the operating means to be automatically actuated thereby to set the brake mechanism when the vehicle is moved backward while the clutch is in engagement.

7. In a vehicle the combination of an axle provided with drive wheels, a drum loose upon the axle, a clutch comprising members, one of which is secured to the axle and the other carried by said drum, a helical spring mounted upon the axle and connected with said drum to turn the latter backward and to move the same upon the axle to hold the clutch members in engagement, means for imparting a positive intermittent movement to the drum, a brake mechanism arranged to coöperate with the drive wheels, brake operating means arranged in the path of the drum operating means to be positively actuated thereby when the vehicle is moved backward while the clutch members are in engagement, and a shipper for moving the drum to throw the clutch members out of engagement.

8. In a vehicle the combination of an axle provided with drive wheels, a clutch member secured to said axle, a drum loose upon the axle and provided with a clutch member to engage the fixed clutch member, a helical spring mounted upon the axle and secured at one end to the drum and at its opposite end to a part of the framework of the vehicle, said spring exerting a pressure upon the drum to hold the clutch member in engagement and serving to yieldingly hold the drum in a given position, a brake beam provided with brake shoes to engage the drive wheels, an arm connected with the brake beam, an operating lever adapted to engage said arm to set the brake, and a strap having one end connected to the operating lever and having its opposite end attached to and adapted to wind upon the said drum.

9. In a vehicle the combination of drive wheels, steering wheels, a head piece mounted upon the vehicle and comprising vertically arranged spaced portions having lateral extensions which are connected with the steering wheels, an operating lever mounted upon said head piece and adapted to operate between the vertically arranged spaced portion thereof, and connecting means between said operating lever and the drive wheels.

10. In a vehicle the combination of steering wheels, drive wheels, a support comprising a ring, a head piece mounted upon said ring and having an overlapping portion to prevent downward displacement, vertical bars secured to the head piece and underlapping the ring to prevent vertical displacement of the head piece, said bars being transversely spaced and having lateral extensions, connecting means between said lateral extensions and the steering wheels, an operating lever mounted upon the head piece and operating between the vertical bars attached to said head piece, and connecting means between the operating lever and the drive wheels.

In testimony whereof I affix my signature in presence of two witnesses.

FRANK A. GAGNON.

Witnesses:
ALEXANDER TOURANJOE,
F. H. CARR.